April 9, 1968 T. P. HECKMAN 3,376,615

MAGNETIC FASTENER

Filed June 1, 1966 5 Sheets-Sheet 1

Inventor
Thomas P. Heckman
By Burmeister & Kulie
Attorneys

Inventor
Thomas P. Heckman
By Burmeister & Kulie
Attorneys

April 9, 1968 T. P. HECKMAN 3,376,615

MAGNETIC FASTENER

Filed June 1, 1966 5 Sheets-Sheet 5

Inventor
Thomas P. Heckman
By Burmeister & Kulie
Attorneys

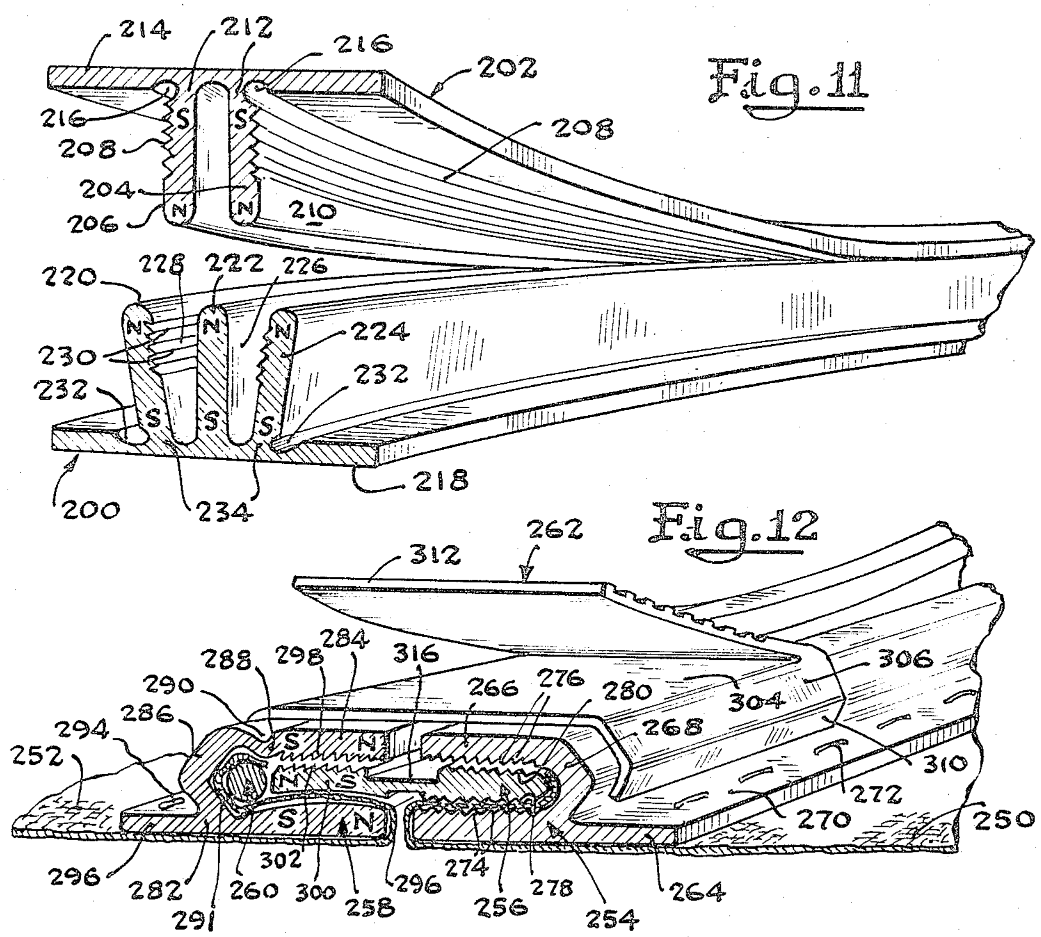
Fig. 11, Fig. 12
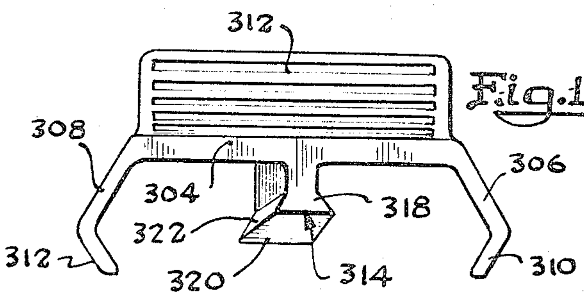
Fig. 13
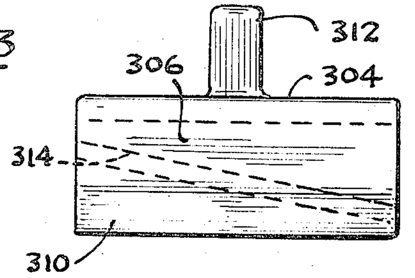
Fig. 14
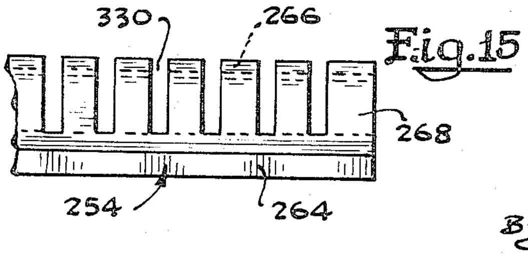
Inventor
Thomas P. Heckman
By Burmeister & Kulie
Attorneys Inventor
Thomas P. Heckman
By Burmeister & Kulie
Attorneys

United States Patent Office 3,376,615

Patented Apr. 9, 1968

3,376,615

MAGNETIC FASTENER

Thomas P. Heckman, 533 Edgewood Road, Lombard, Ill. 60148

Continuation-in-part of application Ser. No. 367,385, May 14, 1964. This application June 1, 1966, Ser. No. 554,580

14 Claims. (Cl. 24—201)

The present application is a continuation-in-part of application Ser. No. 367,385, filed May 14, 1964, now Patent No. 3,266,112 by the present inventor and entitled "Permanent Magnet Fastener." The present invention also relates to fasteners for holding together two separate members, particularly for securing together two separate members of cloth, leather, plastic, or the like.

The inventor's prior patent application discloses a number of magnetic closures which are effective, and which depend upon the force of a magnetic field for maintaining closure. Often magnetic closures are made of plastic material, and in order to obtain strong magnetic fields, the plastic must be degraded. Hence, magnetic closures have been the most satisfactory form of closures in some applications.

Accordinglly, it is an object of the present invention to provide a magnetic closure which achieves a closing force which exceeds the magnetic force of the closure.

Prior to the present invention, most latch mechanisms for doors, windows, and the like, have employed metal parts, and closure of the door created a noise of metal striking against metal. In addition, most latch mechanisms require precise fitting of the parts of the latch mechanism and the two members which are to be latched. It is an object of the present invention to provide a magnetic latch mechanism. In addition, it is an object of the present invention to provide a latch mechanism which does not utilize metal parts and which closes relatively silently.Further, it is an object of the present invention to provide a latch mechanism which does not require the precise positioning of parts in order to achieve a proper closed position for a door, window, or the like.

Most locks in use today utilize either a combination or a metal key for unlocking the lock. Metal keys may be readily cut, and combination locks have not proven highly popular because of the requirement that the combination be known before the lock can be opened. It is an object of the present invention to provide a lock with a keying system which will not be visible from the key itself. In particular, it is an object of the present invention to provide a lock utilizing a magnetized key structure of improved construction.

It is also an object of the present invention to provide a magnetic closure for a bottle, or the like.

Further, it is an object of the present invention to provide an improved magnetic zipper, and in particular, a magnetic zipper which may be utilized to connect two adjacent sheets of colth with a minimum visible seam.

These and further objects of the present invention will be more readily understood from a further consideration of this specification, particularly when viewed in the light of the drawings, in which:

FIGURE 11 is an isometric view of a mangetic zipper which constitutes another embodiment of the present invention;

FIGURE 12 is an isometric view, partly in section, illustrating another magnetic zipper constructed according to the teachings of the present invention;

FIGURE 13 is an elevational view of the closer-opener slide for the zipper of FIGURE 12;

FIGURE 14 is a plan view of the closer-opener slide of FIGURE 13;

FIGURE 15 is a side elevational view of the zipper of FIGURE 12;

Figures 1, 2:
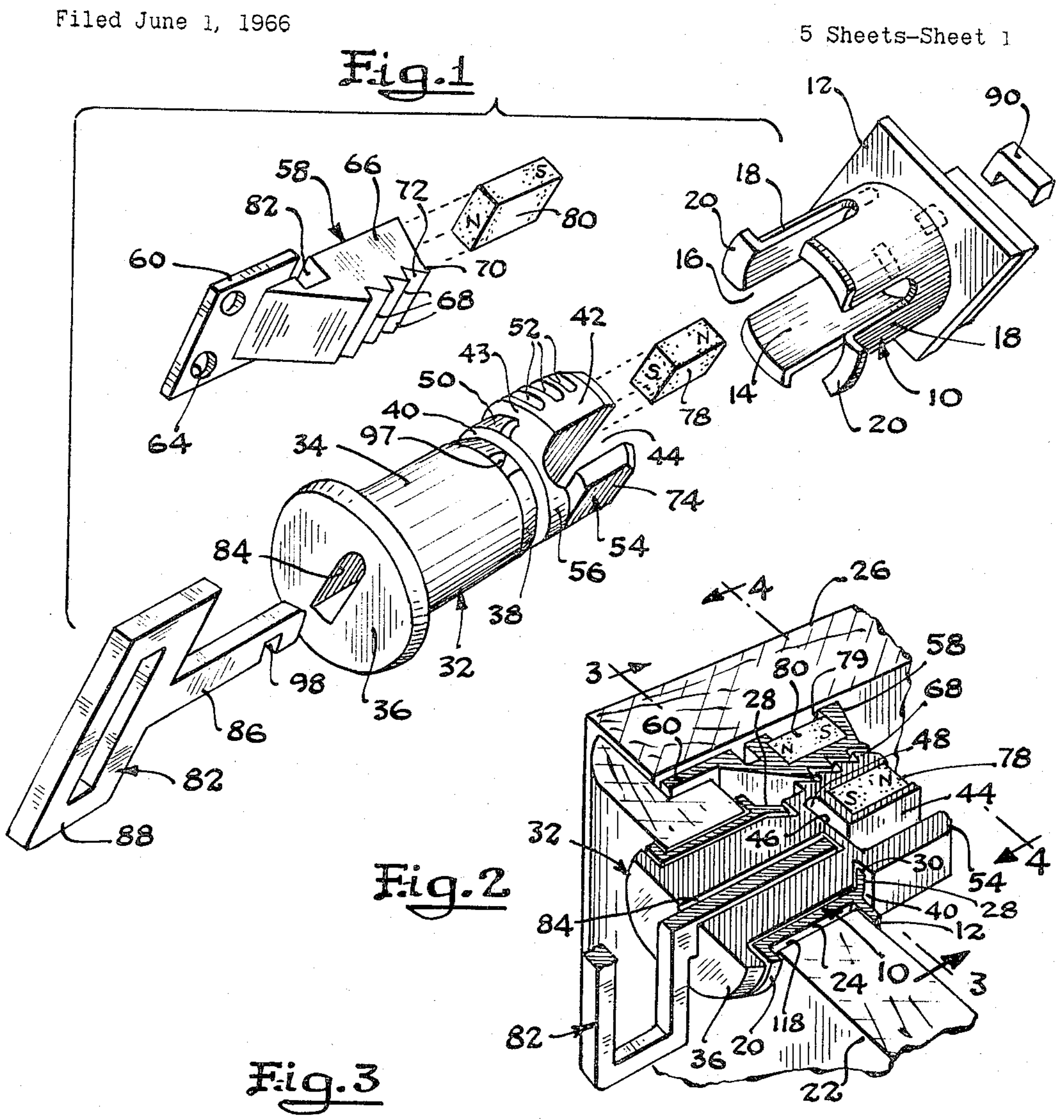
FIGURE 1 is an exploded view of a lock and latch mechanism constructed according to the teachings of the present invention.
FIGURE 2 is an isometric view showing in section the lock and latch mechanism illustrated in FIGURE 1, mounted on the cabinet and cabinet door.

FIGURES 1 through 5 illustrate a magnetic cabinet latch and simple lock. The individual parts employed in the cabinet latch and lock are illustrated isometrically in the exploded view of FIGURE 1, and FIGURES 2, 4 and 5 illustrate the cabinet latch and lock mounted on the door of a cabinet. The cabinet latch and lock has a barrel 10 which is cylindrical in form and extends outwardly perpendicular to an integral plate 12. The barrel 10 also has a cylindrical opening 14 extending coaxially therethrough, and a plurality of slots 16 extend inwardly from the side of the barrel opposite the plate 12. The slots 16 form a plurality of spaced ribs 18 which are somewhat elastic, and the end of each of the ribs 18 is provided with a flange portion 20 which extends normal to the axis of the opening 14 and terminates on a circular segment centered on the axis of the opening 14.

Figure 5:
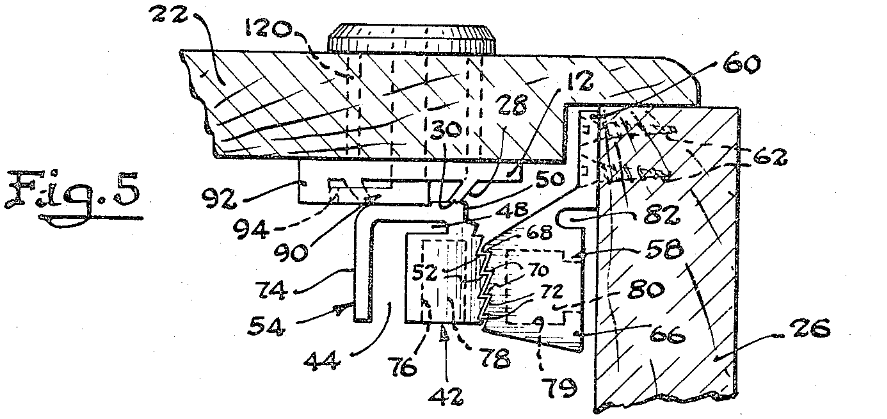
FIGURE 5 is a sectional view taken along the line 5—5 of FIGURE 4.
Figure 4:
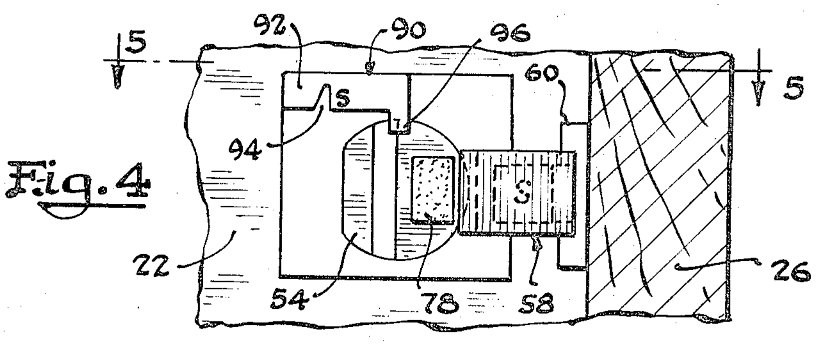
FIGURE 4 is a sectional view taken along the line 4—4 of FIGURE 2.

As illustrated in FIGURES 2, 4 and 5, the cabinet has a door 22 which is provided with a circular aperture 24 located adjacent to a side wall 26 of the cabinet. The barrel 10 is inserted into the aperture 24 by bending the flexible ribs 18 inwardly on each other, and inserting the flange portions 20 into the rear side of the opening 24 of the door 22. The barrel 10 has a length parallel to its axis as measured between the surface of the plate 12 and the confronting surfaces of the flange portions 20 approximately equal to the thickness of the door 22, and when the barrel 10 is fully inserted from the rear side of the door 22, the flange portions 20 of the flexible ribs 18 are forced outwardly so that the barrel once again assumes a cylindrical configuration. The barrel 10 also has a plurality of conical segments 28 which extend from the side of the plate 12 opposite the barrel 10 and ascribe a cone which tapers inwardly from the diameter of the barrel 10. The conical segments 28 terminate in flat circular rims 30 with an inner diameter slightly smaller than the inner diameter of the barrel 10.

A tumbler-latch member 32 is provided with a cylindrical portion 34 with a diameter slightly less than the inner diameter of the barrel 10, and the tumbler-latch member 32 is disposed within the barrel 10 with the cylindrical portion 34 rotatable therein. The tumbler-latch member 32 has an outwardly extending circular flange 36 at one end which rotatably abuts the flange portions 20 of the ribs 18 of the barrel 10. Also, the member 32 has a groove 38 which tapers inwardly in a conical surface from the cylindrical portion 34, and has a circular shoulder 40 disposed normal to the axis of the cylindrical portion 34 extending outwardly from the end of the conical portion. The shoulder 40 abuts the rims 30 of the barrel 10 to anchor the tumbler-latch member 32 within the barrel 10.

The tumbler-latch member 32 has a protruding hub 42 which extends outwardly from the groove 38 on the opposite side thereof from the cylindrical portion 34, and the hub 42 terminates in a cylindrical surface of greater diameter than the cylindrical portion 34. The hub 42 is provided with a slot 44 which extends therein from the side of the hub remote from the cylindrical portion 34, and the slot 44 extends to a surface adjacent to the groove 38, the surface being designated 46 and being disposed normal to the axis of the cylindrical portion 34. The surface 46 is a portion of a recess 48 which extends between the hub 42 and the cylindrical portion 34 of the tumbler-latch member 32, and the recess 48 provides a hinge joint 50 at the perimeter of the hub 42 adjacent to the end of the conical segments 28. The portion of the hub 42 separated from the cylindrical portion 34 by the hinge joint 50 is provided with grooves 52 on its exterior surface, the grooves being arcuate and parallel to each other.

The hub 42 also has a second portion 54 formed by the slot 44. The second portion 54 also has a hinge joint 56 which is provided by the groove 38 coming in close proximity to the slot 44. As a result, the two portions of the hub 42 may be displaced toward each other, thus reducing or eliminating the slot 44 in order to permit the tumbler-latch member 32 to be inserted between the ribs 18 of the barrel 10 from the front side of the door 22, and the tumbler-latch member 32 may be forced past the conical segments 28 to cause the rims 30 to engage the shoulder 40. In this position, all external forces are removed from the two portions of the hub 42, and the two portions of the hub 42 may assume their normal position, that is, the position in which the walls of the slot 44 are parallel to each other.

The cabinet latch and lock also employs a strike member 58 which is mounted by an apertured plate portion 60 on the inner surface of the side wall 26, as by screws 62 extending through apertures 64 into the side wall 26. The strike member 58 also has an integral body portion 66 which is provided with a plurality of straight ridges 68 which are adapted to engage the grooves 52 of the hub 42, the summit of the ridges 68 being disposed on a flat plane parallel to the adjacent surface of the side wall 26. Each of the ridges 68 has a surface remote from the rear surface of the door 22 which is disposed parallel to the rear surface of the door 22, this surface being designated 70. Each of the ridges also has a second surface 72 confronting the rear surface of the door 22 which is disposed at an acute angle to the surface of the door 22. The grooves 52 of the hub 42 have mating configurations, so that the hub 42 will not readily pull from the strike member 58 when the ridges 68 are engaged in the grooves 52 of the hub 42.

Since the grooves 52 extend about the hub 42 throughout an arc of only approximately 180°, the grooves 52 may become disengaged from the ridges 68 of the strike member 58 by rotation of the tumbler-latch member 32 throughout an angle of approximately 180°. When this is accomplished, a flat surface 74 of the second hub member 54 confronts the strike member 58, and is spaced therefrom, to permit the door 22 to be freely removed or rotated from its locked position on the side wall 26.

The first portion of the hub 42 is provided with a recess 76 which extends therein from the end of the hub 42 remote from the plate 12, and the recess 76 is filled by a rectangular magnet 78. The magnet 78 is polarized generally parallel to the axis of the cylindrical portion 34 of the tumbler-latch member 32, for example, with a south pole adjacent to the plate 12 and a north pole remote from the plate 12, as illustrated. Also, the strike member 58 is provided with a generally quadrangular recess 79, and a quadrangular magnet 80 is disposed within the recess 79. The magnet 80 is polarized along an axis generally parallel to the polarization axis of the magnet 78 when the two are positioned adjacent to each other, but the magnet 80 has a pole confronting the rear surface of the door 22 opposite to the pole of the magnet 78 confronting the rear surface of the door 22. As illustrated in the figures, a north pole is disposed adjacent to the rear surface of the door 22 for the magnet 80, and a south pole is in this position for the magnet 78. Further, the strike member 58 is provided with a transverse slot 82 between the plate 60 and the body 66, thus forming a hinge joint in the region of the slot 82. Further, the body 66 of the strike member 58 is spaced from the surface of the side wall 28 by the thickness of the plate 60.

Assuming the door 22 to be in open position, and the tumbler-latch member 32 in a rotatable position to cause the grooves 52 to engage the ridges 68 of the strike member 58, the door 22 may still be closed without forcing the hub 42 over the ridges 68. Closing of the door from this position will cause the north pole of the magnet 78 to confront the north pole of the magnet 80, thus resulting in repulsion of the first portion of the hub 42 from the body 66 of the strike member 58. Since the strike member is free to pivot on the hinge joint formed by the slot 82 and the first hub portion is free to pivot on the hinge joint 50, the first portion of the hub 42 will not engage the body 66 of the strike member as long as the north poles of the magnets 78 and 80 are adjacent to each other. However, when the door 22 is sufficiently closed to cause the north pole of the magnet 78 to confront the south pole of the magnet 80, repulsion is replaced by attraction, and the first portion of the hub 42 is forced against the body 66 of the strike member 58, thereby resulting in locking of the ridges 68 within the grooves 52. Further, magnetic attraction between the magnet 78 and the magnet 80 will result in maintaining the latched position.

FIGURES 1 and 2 illustrate a key 82 which is shown in FIGURE 2 as mounted within a rectangular slot 84. The key 82 forms a knob by rotating the tumbler-latch member 32 between the locked and unlocked positions. It is to be understood that as far as this embodiment of the invention has been described to this point, the key 82 could be integral with the tumbler-latch member 32, assuming its sole function is to provide a knob for rotation of the member 32. However, as illustrated in FIGURES 1 through 11, the key 82 also provides a locking or selection function.

Figure 3:
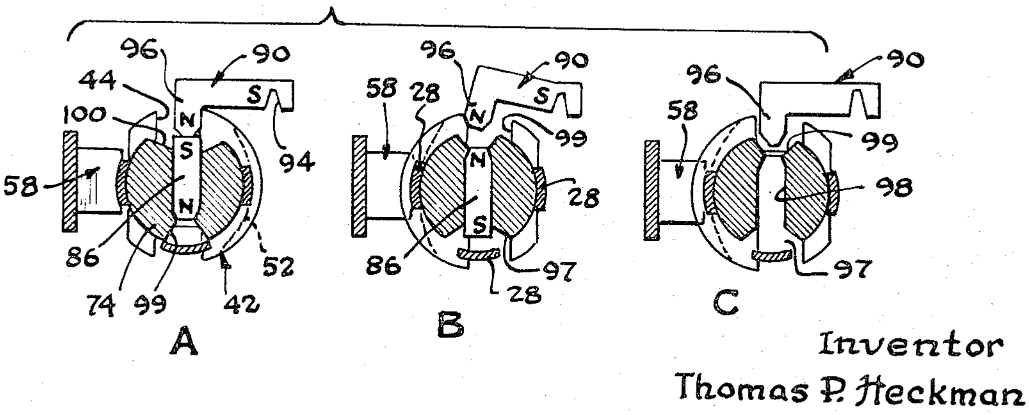
FIGURE 3 is a sectional view taken along the line 3—3 of FIGURE 2, FIGURE (A) illustrating the lock in the unlocked position, FIGURE (B) illustrating the lock in the locked position with the key inserted, and FIGURE (C) illustrating the lock in the locked position with the key withdrawn.

As illustrated in FIGURES 1 through 3, the key 82 has a shank 86 extending outwardly from a ring 88, the ring being used as a handle or knob. The entire assembly of ring 88 and shank 86 is constructed of material capable of maintaining a magnetic polarization, such as iron. The shank 86 is dimensioned and shaped to slide within the slot 84, the slot 84 terminating adjacent to the recess 48.

An arm 90 is mounted at one end by a stub 92 on a corner of the plate 12, and the arm 90 has a groove 94 extending therein adjacent to the stub 92 to provide a hinge joint to permit the arm 90 to pivot in a plane parallel to the plate 12. The arm 90 carries a pawl 96 at its end opposite the stub 92, and the pawl 96 is adapted to be disposed within and engage the walls of an orifice 97 which extends from the exterior surface of the cylinder 32 into the inner end of the slot 84. A second orifice 99 extends from the opposite side of the cylinder 32 into the end of the slot 84, thus forming a channel through the end of the slot along an axis parallel to the transverse axis of the slot 44.

The arm 90 is constructed of magnetic material, such as magnetic plastic, and it is provided with one magnetic pole in the region of the pawl 96 and the other magnetic pole in the region of the hinge joint 94. In the particular illustration set forth a north pole, designated N, is located in the region of the pawl and a south pole, designated S, is located in the region of the hinge joint 94. It is to be understood that the arm 90 may simply be constructed of a resilient plastic material and provided with a recess for a solid permanent magnet, such as a ceramic magnet or a nickel-iron magnet.

When the key is inserted into the slot 84, a portion of the key confronts the pawl 96 of the arm 90. This portion of the key 82 is also magnetically polarized along an axis perpendicular to the longitudinal axis of the shank 86. As illustrated in FIGURE 3(A), the shank 86 has a north pole remote from the arm 90 and a south pole confronting the arm 90, thereby attracting the pawl 96 into the slot 44 and causing the pawl to abut the shank 86 of the key. As is shown in FIGURE 1, the key 82 is provided with a rectangular recess 98 in the region confronting the arm 90, and this recess 98 accommodates the pawl 96 of the arm when the south pole of the shank 86 attracts the north pole of the pawl 96. As a result, the key 82 may not be withdrawn from the slot 84, and the ring 88 of the key 82 forms an anchored knob for opening the door 22. It is also to be noted from FIGURE 3(A) that the portion of the hub 42 containing the grooves 52 is remote from the strike member 58, so the door 22 is free to be opened.

It is to be noted that the orifice 97 is provided with a flat surface 100 extending from the orifice which is adjacent to the pawl 96 in the unlocked position illustrated in FIGURE 3(A). As a result, the key 82 may be rotated in the clockwise direction, since the pawl 96 will slip over the surface 100. By rotating the key 82, and consequently the tumbler-latch member 32, through an angle of 180°, the north pole of the shank 86 of the key 82 will be brought into confrontation with the pawl 96 of the arm 90 through the second orifice 99. Since the pawl 96 also has a north pole, the arm 90 will be repelled from the key shank 86, and caused to pivot out of the orifice 99. The pawl 96 will in this position not abut the key shank 86, and the key may readily be withdrawn from the slot 84. As a result of withdrawing the key 82, the north pole of the shank 86 of the key is removed from the region of the north pole of the pawl 96, and the arm 90 is permitted to resume its equilibrium position, as shown in FIGURE 3(C). In the position of rest, the arm 90 positions its pawl 96 in the orifice 99, as shown in FIGURE 3(C), thus preventing further rotation of the tumbler-latch member 32 as a result of a knife or some other object being positioned in the slot 84. It is to be noted that in FIGURE 3(B) and in FIGURE 3(C), the grooves 52 of the hub 42 engage the ridges 68 of the strike 58, and the door 22 is securely locked on the side wall 26.

FIGURES 6 through 10 illustrate a lock mechanism which may be substituted for the tumbler-latch member 32 and barrel 10 illustrated in FIGURES 1 through 5, and the same reference numerals used in FIGURES 1 through 5 are used in FIGURES 6 through 10 for identical parts. It is to be noted that the door 22 is provided with slots 118 which accommodate fins 120 extending between the flange 114 on the barrel 10 which prevent the barrel 10 from rotating in the door.

Figure 6:
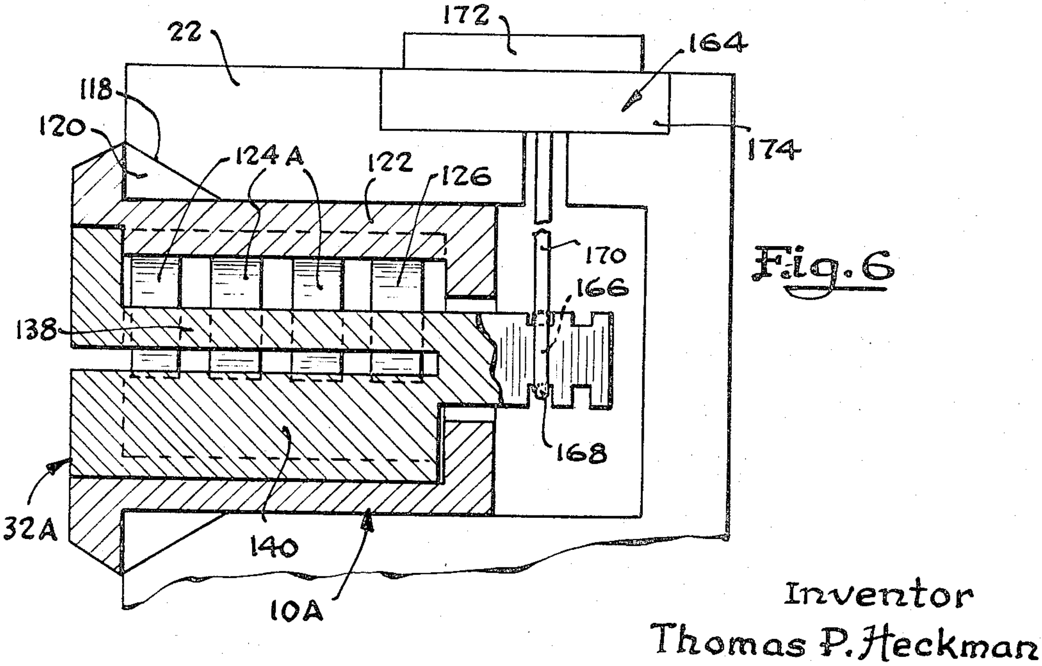
FIGURE 6 is a sectional view taken along the central axis of a lock which constitutes another embodiment of the present invention.
Figure 7:
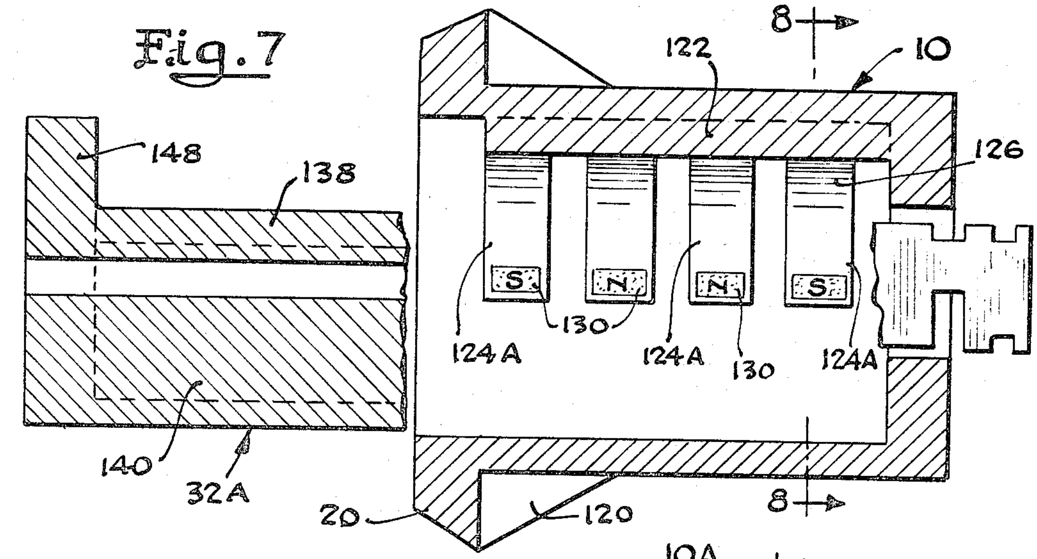
FIGURE 7 is a longitudinal sectional view of the barrel of the lock of FIGURE 6.
Figure 8:
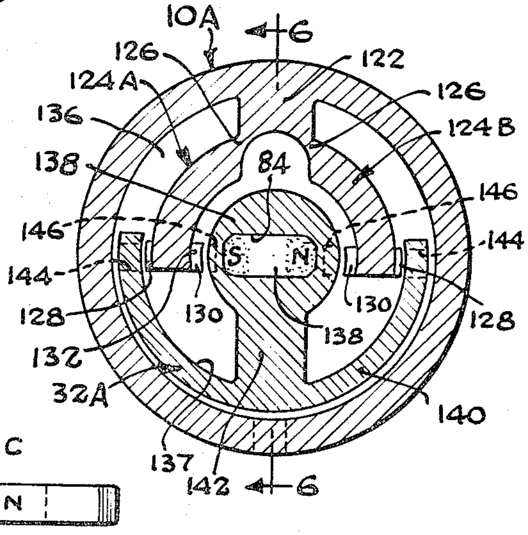
FIGURE 8 is a senctional view taken along the line 8—8 of FIGURE 7.
Figure 10:
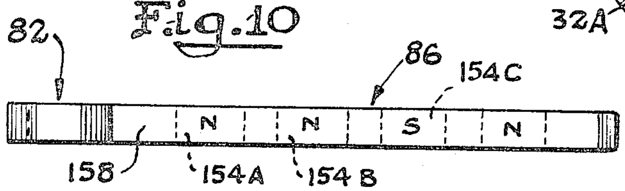
FIGURE 10 is a side elevational view of the key illustrated in FIGURE 9.

As illustrated in FIGURES 6, 7, and 8, a cylindrical barrel 10A is provided with a straight rib 122 which extends inwardly from the cylindrical inner surface of the barrel 10A parallel to the axis thereof. A plurality of pairs of arcuate fins 124A and 124B extend from the rib 122, a fin 124A and a fin 124B being disposed in each of a plurality of parallel planes disposed normal to the axis of the rib 122. Each of the fins 124A and 124B is integral with the rib 122 and coupled to the rib 122 by a hinge joint 126 in the form of a region of restricted cross section, thus permitting the fins 124A and 124B to be pivoted on axes parallel to the axis of the rib 122. The fins 124A and 124B are arcuate and centered on the axis of the cylindrical portion of the barrel 10A. Further, the fins 124A and 124B each extend through an arc of slightly greater than 90°.

The fins 124A and 124B are each provided with an outwardly protruding lobe 128 or 130, the lobes 128 and 130 being disposed on a common plane passing through the central axis of the cylindrical surface of the barrel 10A and extending from opposite sides of the same fin 124A and 124B. As illustrated, the lobes 128 and 130 have a rectangular cross section and are formed by a permanently magnetized rectangular magnet 132 securely mounted on the fins 124A and 124B. The magnet 132 is polarized along its longitudinal axis, that is, in a plane perpendicular to the axis of the cylindrical barrel 10A and along an axis perpendicular to the arcuate axis of the fins 124A and 124B.

A tumbler-latch member 32A forms a rotor disposed within the barrel 10A, and the rotor is in slidable abutment with the inner surface of the barrel 10A. The rotor has a central hub 138 with a circular cross section disposed coaxially within the cylindrical surface of the barrel 10A and within the fins 124A and 124B. The hub 138 is integral with a part cylindrical outer shell 140, the shell 140 and hub 138 being interconnected by an elongated rib portion 142 extending parallel to the axis of the barrel 10A. The shell 140 extends through an arc slightly greater than 180°, and is provided with a plurality of rectangular apertures 144 at its ends. The apertures 144 are disposed adjacent to both ends of the shell 144 in a common plane which also traverses the central axis of the hub 138, and the apertures 144 are spaced from each other by the same distance as the spacing between the fins 124A and 124B, one aperture 144 confronting each of the lobes 128 on the fins 124A and 124B. In one rotational position of the rotor 32A in the barrel 10A, the apertures 144 are adapted to accommodate the lobes 128 when the fins 124A and 124B are pivoted outwardly relative to the hub 138 on the hinge joints 126.

In like manner, the hub 138 is provided with rectangular recesses 146 disposed on opposite sides of the hub and in the same plane as the apertures 144. The recesses 146 are also spaced by the same distance as the fins 124A and 124B, and the recesses 146 are adapted to accommodate the lobes 130 of the fins 124A and 124B. Hence, when the plane of the apertures 144 and recesses 146 coincides with the plane of the lobes 128 and 130, the fins 124A and 124B may be pivoted inwardly or outwardly relative to the axis of the hub 138 to position the lobes 130 in the recesses 146, or the lobes 128 in the apertures 144, respectively.

The rotor 32A is provided with an outer diameter approximately equal to the inner diameter of the barrel 10A, and has a face disc 148 rotatably disposed within the barrel 10A. The slot 84 extends through the face disc 148 and into the hub 138 along the axis of the hub 138. The slot 84 has a non-circular contour, rectangular in the particular embodiment set forth, so that the key 82 may be inserted in the slot 84 and be nonrotatable therein. As illustrated in the figures, the slot 84 has a rectangular cross section with its longer transverse axis disposed in the plane of the apertures 144, and the key 82 has a mating configuration of slightly smaller dimensions to permit the key to be withdrawn and inserted manually.

Figure 9:
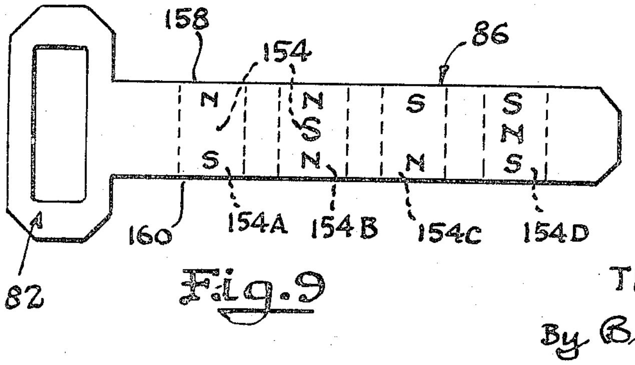
FIGURE 9 is an elevational view of the key for use in the lock of FIGURES 6 through 8.

The shank 86 of the key 82 is constructed of materials which will maintain a permanent magnetic polarization, such as a nickel-iron composition, and the key is provided with a plurality of regions 154 which maintain permanent magnetization. There are an equal number of regions 154 to pairs of fins 124A and 124B, and the regions 154 are spaced from each other by the same distance as each pair of fins is spaced from adjacent pairs of fins, so that one of the regions 154 will be aligned with a pair of fins 124A and 124B. Each of the regions is magnetized along an axis disposed normal to the axis of elongation of the key 152 so that a pole is located at the edge of the key in each region. The first region of the key 152, located adjacent to the handle 88 of the key and designated 154A, has two poles, one disposed adjacent to the first side of the key, designated 158, and the other an opposite pole located adjacent to the other edge of the key 160. As illustrated in FIGURE 9, the pole adjacent to the edge 158 is a north pole, and the pole adjacent to the edge 160 of the region 154A is a south pole. In like manner, the region 154B, located adjacent to the region 154A, has poles located on the edges 158 and 160, but these poles are of the same magnetic polarity, the pole of opposite polarity being located centrally between these poles. The next region, 154C, has poles of opposite polarity located on the edges 158 and 160, and the final region designated 154D has poles of like polarity adjacent to the edges 158 and 160, and an opposite pole located centrally between the edges 158 and 160.

When the key 82 is inserted into the slot 84, the regions 154 of the key are aligned with the pairs of fins 124A and 124B, FIGURE 8 illustrating the region 154A aligned with the fins 124A and 124B. It will be noted that the region 154A has a south pole at the edge 160 which confronts a south pole of the lobe 130 of the fin 124A, thereby repelling the fin 124A. The fin 124A is provided with a permanent set in which the lobe 130 is engaged in the recess 146, and the magnetic repulsion between the south pole of the lobe 130 causes the fin 124A to pivot on the hinge joint 126 outwardly to the region between the hub 138 and the shell 140 of the rotor 32A. If the magnetic repulsion is greater than the force of the resilience of the permanent set of the fin 124A, the fin 124A will pivot outwardly on the hinge joint 126 to cause the lobe 128 to engage the aperture 144 in the shell 140, thus once again locking the rotor 134 on the barrel 10A. It is only when the repulsion of the south pole of the key against the south pole of the lobe 130 is of proper strength that the fin 124A will assume a position intermediate the hub 138 and the shell 140 to permit the rotor 32A to be rotated relative to the barrel 10A.

In like manner, the north pole adjacent to the edge 158 in the region 154A of the key 82 confronts a north pole of the lobe 130 of the fin 124B. The fin 124B has a permanent set causing the lobe 128 to engage the recess 144 of the shell 140, and the magnetic attraction between the north pole of the key 82 and the south pole of the lobe 130 causes the fin 124B to pivot on the hinge joint 126 inwardly to a position between the hub 138 and the shell 140, thereby permitting rotation of the rotor 32A relative to the barrel 10A.

In like manner, each of the regions 154B, 154C, and 154 D of the key 82 confront the lobes 130 of the other pairs of the fins 124A and 124B. As illustrated, the key 82 must have eight poles located in the proper position to provide the correct magnetic fields to release the fins 124A and 124B from the rotor 32A in order to permit the rotor to be rotated relative to the barrel 10A. In addition, the strength of the magnetic fields produced by the key must be proper, or the key will not affect the release of the fins from the rotor.

The rotor 32A and barrel 10A illustrated in FIGURES 6 through 11 may be utilized with the latch and strike mechanism illustrated in FIGURES 1 through 5, or with any latching means, designated 164 in FIGURE 6. As there illustrated, the rotor 32A carries an eccentrically mounted circular cam 166 which carries a rotatable ring 168. The ring 168 actuates the latching means 164 through a shaft 170 to translate a latch 172 into a housing 174 of the latching means 164.

Throughout the embodiment of FIGURES 1 through 10, hinged joints are employed to provide pivotal action, but these hinged joints are illustrated as regions of restricted cross-section, such as the hinged joints 126 illustrated in FIGURE 7. This construction makes possible unitary molded structures, such as a single molded barrel 10A, rib 122, and fins 124A and 124B. It is, however, within the contemplation of the present invention to provide separate elements coupled together by other types of hinge joints, such as a metal leaf spring which will provide pivotal action and also the necessary spring bias to return the pivoted member to a rest position.

FIGURE 12 sets forth a magnetic zipper construction which constitutes an improvement over that of the present inventor's patent application Ser. No. 367,385 entitled "Permanent Magnet Fastener." The magnetic zipper illustrated in FIGURE 11 utilizes two strips 200 and 202 constructed in plastic material capable of maintaining a magnetic polarization. The strips 200 and 202 are intended to be mounted on two members which are to be joined by the magnetic zipper of FIGURE 11, such as two sheets of cloth. The strip 202 is provided with two outwardly extending ribs 204 and 206, and the ribs 204 and 206 are provided with a plurality of elongated teeth 208 which extend outwardly from their remote flat surfaces, the surfaces being designated 210. Further, each of the ribs 204 and 206 has a hinge joint or flexure joint 212 disposed between the ribs 204 and 206 and the portion from which the ribs extend, referred to as a base 214. The flexure joints 212 extend along the entire length of the ribs 204 and 206 and are in the form of a groove 216 extending into the rib 204 or 206 and into the base 214. Each of the ribs 204 and 206 has a magnetic pole adjacent to the base of one side, and an opposite magnetic pole in its region remote from the base, FIGURE 11 illustrating an S for a south pole adjacent to the base and an N for a north pole remote from the base.

The strip 200 is designed to mate with the strip 202, and the strip 200 has a base 218 from which three ribs 220, 222, and 24 protrude along the axis of the rib parallel to each other and perpendicular to the base 218. The rib 222 has a pair of parallel opposed surfaces 226 which are free of teeth and are adapted to slide between the surfaces of the ribs 204 and 206 of the strip 202. However, the surfaces 228 of the ribs 220 and 224 which confront the rib 222 are provided with a plurality of teeth 230 which extend along the surfaces 228 parallel to the longitudinal axis of the strip 200 and are adapted to mate with the teeth 208 of the ribs 204 and 206 of the strip 202. Further, the ribs 220, 222, and 224 of the strip 200 carry magnetic poles adjacent to the base 218 of the same magnetic polarization as the magnetic poles of the ribs 204 and 206 which are disposed adjacent to the base 214, and FIGURE 11 shows these magnetic poles as south poles. In like manner, opposite poles extend along the edges of the ribs 220, 222, and 224 remote from the base 218, and FIGURE 11 illustrates these poles as north poles. Further, grooves 232 are disposed in the base 218 and the adjacent portion of the ribs 220 and 224 remote from the rib 222 to provide elongated flexture joints 234 at the intersection of the ribs 222 and 224 and the base 218 so that the ribs 220 and 224 may flex outwardly relative to the rib 222. When the zipper is to be engaged, the strip 202 is meshed with the strip 200 by inserting the rib 204 of the strip 202 between the ribs 222 and 224 of the strip 200 and inserting the rib 206 of the strip 202 between the ribs 222 and 220. As the ribs of the strip 202 approach the ribs of the strip 200, the ribs of the strip 202 are forced by magnetic repulsion away from each other, thereby causing the ribs 204 and 206 to pivot outwardly relative to each other on the hinge joints 212. In like manner, the ribs 220 and 224 are repelled magnetically from the rib 222, and the ribs 220 and 224 pivot outwardly on the hinge joints 234 relative to the rib 222, thus providing large gaps for the insertion of the ribs 204 and 206 between the rib 222 and the ribs 220 and 224. Further, the ribs of the strip 202 must be inserted between the ribs of the strip 200 against the magnetic repulsion resulting from the fact that the poles of the rib 200 and the poles of the rib 202 which confront each other are the same. However, once the ribs of the strip 202 penetrate the region between the ribs of the strip 200 sufficiently to cause the attraction between the north poles of the ribs of the strip 202 and the south poles of the ribs of the strip 200, magnetic attraction will complete the engagement of the strip 202 within the ribs of the strip 200. At the same moment, magnetic attraction replaces the repulsion which has caused the ribs of the strip 202 to pivot outwardly relative to each other, and has caused the ribs of the strip 200 to pivot outwardly relative to each other, and the ribs 204 and 206 will pivot on the hinge joints 216 toward each other, and the ribs 220 and 224 will pivot on the hinge joints 234 toward the rib 222. This latter action results in the teeth 208 of the ribs 204 and 206 engaging the teeth 230 of the ribs 220 and 224. To open the zipper, it is necessary to force the strip 202 from the strip 200 against the interference caused by the meshed teeth 208 and 230 as well as the magnetic attraction afforded by the poles of the strips 200 and 202.

In FIGURES 12 through 15, another embodiment of a magnetic zipper is illustrated. The magnetic zipper set forth in this embodiment is intended to interconnect two flat sheets, particularly flexible sheets of cloth, plastic, or the like, the sheets being designated by the reference numerals 250 and 252. The magnetic zipper itself consists of five separate parts designated 254, 256, 258, 260, and 262. The part 254 is an elongated strip which has a flat base 264 and a flat wall 266 spaced from and parallel to the base 254. The wall 266 is interconnected centrally of the elongated base 264 by a curve end 268, and the base 264, wall 266, and end 268 form an integral elongated flexible strip. Since the end 268 extends from approximately the center region of the base 264, an outwardly extending flange 270 is provided, and the flange 270 is secured on the cloth 250 by one or more rows of sewing 272.

The surface of the base 264 confronting the surface of the wall 266 is provided with a plurality of rows of protruding teeth 274. Further, the surface of the wall 266 confronting the teeth 274 is also provided with a plurality of rows of teeth 276, the teeth being disposed parallel to the longitudinal axis of the part 254.

The part 256 is an elongated flexible member, and one edge of the flexible member is provided with rows of teeth 278 which are adapted to mesh with the teeth 274 of the part 254, and 280 which are adapted to mesh with the rows of teeth 276, and this edge of the member 256 is wedged between the base 264 and wall 266 of the part 254 so that the teeth of the part 256 engage the teeth of the part 254 and secure the part 256 on the part 254.

Further, the part 256 may simply be inserted between the wall 266 and the base 264 of the part 254, and prior to inserting the part 256 the loose end of the layer of cloth 250 is bent about the edge of the base 264 and positioned in the region between the wall 266 and the base 264. In this manner, insertion of the part 256 between the base 264 and wall 266 is effective to anchor the loose end of the layer of cloth 250 so that this end need not be sewn.

The part 258 also has a base 282 in the form of an elongated flexible strip similar to the base 264. Also, the part 258 has a wall 284 parallel to the base 282 and mounted on the base 282 by a curved end 286. The curved end 286 is integral with the base 282 and joined to the wall 284 through an elongated region of restricted cross section forming a flexture joint 288, the joint 288 being formed by a groove 290 parallel to the axis of elongation of the part 258.

The end 286 forms an elongated channel with the base 282, the channel being designated 291, and the part 260 in the form of an elongated flexible rod is disposed within the channel 291. The layer of cloth 252 is secured to the part 258 by means of a row of stitching 294 extending through a flange 296 located at one edge of the part 258. The loose end of the layer 252 of cloth is thereupon wrapped about the opposite edge, designated 296, of the base 282, and about the rod 260 to anchor the loose end within the channel 291.

The wall 284 is magnetically polarized with one pole, designated a south pole in FIGURE 12, disposed adjacent to the flexture joint 288, and an opposite pole, designated a north pole, located adjacent to the edge of the wall 284 remote from the flexture joint 288. Also, the surface of the wall 284 confronting the base 282 of the part 258 is provided with teeth 298. In like manner, the confronting portion of the base 282 is magnetically polarized with a south pole adjacent to the channel 290 and a north pole adjacent to the edge 296. As a result, the magnetic polarization of the base 282 opposes the magnetic polarization of the wall 284, and the wall is pivoted outwardly on the hinge joint 288.

The part 256 has an edge, generally designated 300, which is adapted to be inserted between the base 282 and the wall 284 of the part 258. The edge 300 is provided with teeth 302 adapted to mesh with the teeth 298 of the wall 284 and confronting the wall 284. Further, the edge 300 has a surface confronting the base 282 which is smooth and conforms thereto. In addition, the edge 300 has a magnetic pole distributed along the extreme edge thereof which is opposite to the magnetic poles adjacent to the channel 290 of the base 282 and the wall 284, and the edge 300 has an opposite pole disposed inwardly therefrom. As illustrated in FIGURE 12, the edge 300 has a north pole disposed between the south poles of the base 282 and the wall 284 and the south pole disposed between the north poles of the wall 284 and base 282.

Once the edge 300 of the part 256 is disposed between the wall 284 and the base 282 of the part 258, it is held in position by the friction afforded by the teeth 298 and 302 and the magnetic attraction between the part 256 and the part 258. Either a force sufficient to overcome these forces must be applied between the parts 254 and 258, or an open-close slide in the form of the part 262 must be applied.

The open-close slide is shown in FIGURES 13 and 14 in detail and has an upper wall 304 with a pair of side walls 306 and 308 extending therefrom, the side walls 306 and 308 having inwardly taping ends 310 and 312 which curve about the ends 268 and 286 of the parts 254 and 258 to maintain the open-close slide 262 in engagement with the other elements of the zipper. A handle 312 extends outwardly from the wall 304 to permit the operator to grip the zipper.

An actuation body 314 depends from the wall 304 between the edges of the wall 266 and 284 of the parts 254 and 258 and is slidably disposed in a recess 316 in the confronting surface of the part 256. As viewed in FIGURE 12, the portion of the zipper shown in section is in closed position, however, the portion remote therefrom is in open position. The actuation body 314 has one end 318 sufficiently small to be accommodated within the elongated recess 316, but the other end 320 flares outwardly therefrom to a dimension in excess of the width of the spacing between the walls 266 and 284 of the parts 254 and 258. In addition, the actuation member 314 has a surface 322 confronting the wall 284 at an acute angle, and hence as the open-close slide 262 is drawn toward the closed section of the zipper, the wall 284 is forced outwardly relative to the base 282 of the part 258, and the edge 300 of the part 256 is drawn from part 258.

The parts 254, 256, 258 and 260 are all constructed of plastic material and are flexible. The part 262 may be constructed of plastic, or may be constructed of metal. The magnetic regions of the parts 258 and 256 may be provided by small permanent magnets, but preferably are provided by obtaining permanent magnetization of the plastic itself. As indicated in FIGURE 15, additional flexibility may be obtained for the zipper by providing a plurality of slots 330 which extend through the wall 266 and end 268 of the member 254, and in like manner extend through the wall 284 and end 286 of the member 258. The edge 300, and opposite edge of the part 256 may also be slotted, but the center section thereof must be solid.

Figure 16:
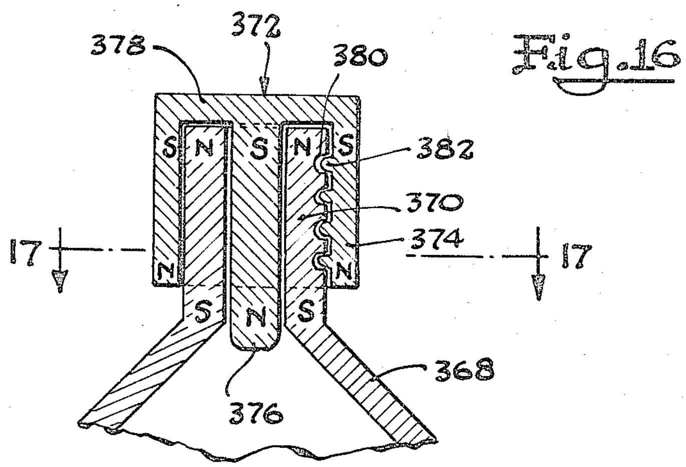
FIGURE 16 is a vertical sectional view of a bottle and cap which constitutes still a further embodiment of the present invention.
Figure 17:
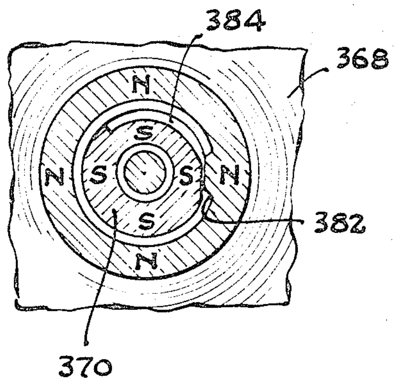
FIGURE 17 is a sectional view taken along the lines 17—17 of FIGURE 16.

FIGURES 16 and 17 illustrate the present invention applied to a closure for a bottle. The bottle 368 has a cylindrical outwardly extending neck 370 which is constructed of magnetically polarizable material. A cylindrical cap 372 is provided for closing the opening of the neck 370, and the cylindrical portion 374 of the cap 372 has an inner diameter sufficient to snugly accommodate the outer surface of the neck 370. In addition, the cap 372 is provided with an axial peg 376 which extends snugly into the neck 370.

The neck 370 is magnetically polarized along its cylindrical axis with one pole disposed at the mouth of the neck 370 and the other pole disposed at the junction of the neck 370 and the bottle 368 proper. In like manner, the cap 372 is magnetically polarized along the cylindrical axis of the portion 374 thereof with one pole at the disc portion of the cap, designated 378, and the other pole at the mouth portion of the cap. The peg 376 also has one of the other poles located at its end remote from the disc portion 378. The poles of the cap located in the disc portion 378 are opposite to the poles of the neck 370 confronting the disc portion 378 of the cap so that the cap is magnetically attracted to the neck 370. Also, the poles of the cap are opposite to the poles located at the junction of the neck and the body of the bottle 368 to provide attraction. Further, when the cap 372 is removed from the bottle 368, the poles of the cap will be opposed to the poles of the bottle to prevent the cap from inadvertently closing the mouth of the neck 170. The bottle and cap may be constructed of any of the magnetic materials described for the previous embodiments, such as glass containing magnetizable particles.

It is to be noted that the neck 370 of the bottle 368 is provided with a plurality of grooves 380 disposed in planes perpendicular to the axis of the neck, the grooves extending through an arc. Further, the cap 372 is also provided with a plurality of inwardly extending ribs from the cylindrical portion 374 thereof, the ribs being designated 382. The ribs 382 are also disposed in planes perpendicular to the axis of the cylindrical portion 374 of the cap 372, and are adapted to mesh within the grooves 380 of the neck 370 of the bottle 368. The grooves 380 extend throughout an arc length at least twice that of the ribs 382, and one end of the grooves 380 terminating in a slot 384 parallel to the axis of the neck 370 and of sufficient arc length to permit the grooves 382 to be withdrawn therethrough.

In order to remove the cap 372 from the bottle 368, it is necessary to rotate the cap to align the ribs 382 with the slot 384, and thereafter withdraw the cap against the attraction of the magnetic field of the cap. Unless the cap is first rotated, the ribs 382 will maintain the cap on the neck 370 of the bottle 368. It is also to be understood that only one set of ribs is shown in FIGURES 16 and 17, but more ribs could also be shown if desired.

Figure 18:
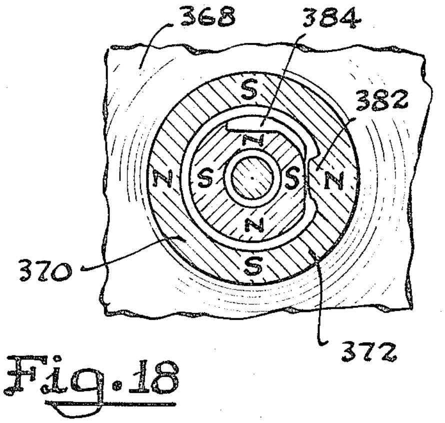
FIGURE 18 is a sectional view on a plane similar to that of FIGURE 17 illustrating a further embodiment of a cap and bottle construction according to the teachings of the present invention.

In FIGURE 18, the same bottle, as far as mechanical construction is illustrated, but the magnetic poles are arranged in different locations in the bottle so that the cap 372 need not be removed against magnetic attraction. In the embodiment of FIGURE 18, the cap 372 is magnetically polarized in sections disposed parallel to the cylindrical axis of the cap, adjacent sections being of opposite polarity. Likewise, the neck 370 of the bottle is polarized in sections parallel to the axis of the neck, adjacent sections being of opposite polarity, and the neck having the same number of sections as the cap. Further, the slot 384 is disposed in a magnetically polarized section of the neck which is of the same polarity magnetically as the section of the cap containing the ribs 382. Further, the section of the neck containing the slots 380 is of the opposite magnetic polarity as the ribs 382.

To remove the cap from the construction of FIGURE 18, the cap is rotated against magnetic attraction to position the ribs 382 in the slot 384, and the cap is thereby removed from the bottle by withdrawing the ribs 382 through the slot 384. However, the act of withdrawing the ribs through the slot 384 is accomplished with the aid of magnetic repulsion.

It is to be understood that the ribs 382 may be located on the neck of the bottle, and the slot located in the cap of the bottle, rather than as shown in the embodiments of FIGURES 16 and 17 and FIGURE 18. It is, however, necessary that the slot 384 be located in the opposite member from the ribs 382, and that the ribs 382 be located along an axis which may be drawn through the slot 384, although this axis may not be parallel to the axis of the neck.

Those skilled in the art will readily devise many modifications for the present invention and conceive many embodiments over and above those herein set forth. It is therefore intended that the scope of the present invention be not limited by the foregoing disclosure, but rather only by the appended claims.

The invention claimed is:

1. A magnetically actuable device for latching a first body on a second body movable relative thereto along an adjacent path comprising: a first member having at least one protrusion extending outwardly from a surface thereof, a second member having an indentation in a surface thereof adapted to receive each protrusion of the first member, means for mounting the first member on the first body with the protrusion thereof confronting the path, means for mounting the second member on the second body with the indentation thereof confronting the path and aligned with the protrusion in one location of the second body in said path, at least one of said means for mounting a member on a body including a hinge joint adjacent to the body permitting the member to pivot relative to the body about an axis normal to the path, thereby permitting the members to abut each other with the protrusion of the first member disposed in the indentation of the second member, means operatively associated with the first member for maintaining a first magnetic field with vectors disposed parallel to the path, means operatively associated with the second member for maintaining a second magnetic field with vectors disposed parallel to the path and directed oppositely from the vectors of the first field.

2. A magnetically actuable device for latching a first body on a second body movable relative thereto along an adjacent path comprising the combination of claim 1 wherein the first member has a plurality of protrusions in the form of teeth, and the teeth extend to a common plane, and wherein the indentations of the second member mate with the teeth.

3. A magetically actuable device for latching a first body on a second body movable relative thereto along an adjacent path comprising the combination of claim 2 wherein each of the teeth is formed by two flat surfaces, one of said surfaces being on a plane generally perpendicular to the path.

4. A magnetically actuable device for latching a first body on a second body movable relative thereto along an adjacent path comprising the combination of claim 2 wherein the second member has a part cylindrical surface centered on an axis parallel to the path, each indentation being in the form of a groove in the cylindrical surface along a plane normal to the axis of the cylinder, and the means for mounting the second member on the body permitting rotation of the cylinder relative to the body, thereby disengaging the teeth of the first member from the grooves of the second member.

5. A magnetically actuable device for latching a first body on a second body movable relative thereto along an adjacent path comprising the combination of claim 4 wherein the means for mounting the second member on the body comprises a cylindrical opening in the body, a cylinder rotatably mounted in the opening, the second member being mounted on the cylinder with a hinge joint disposed between the second member and the cylinder.

6. A magnetically actuable device for latching a first body on a second body movable relative thereto along an adjacent path comprising the combination of claim 5 wherein the cylinder contains means operatively associated with the second body for locking the cylinder against rotation.

7. A magnetically actuable device for latching a first body on a second body movable relative thereto along an adjacent path comprising the combination of claim 1 wherein both the first member and the second member are provided with hinge joints.

8. A zipper comprising the combination of claim 1 wherein the first body and the second body are first and second elongated strips of flexible material, the first member being an elongated rib of flexible material extending outwardly from the first strip, and the second member being a pair of parallel walls of flexible material extending outwardly from the second strip, each of the walls having a region of restricted width extending along their entire length adjacent to the strip to form a hinge joint, and the protrusion of the first member being in the form of an elongated tooth extending from the rib parallel to the strip.

9. A magnetically actuable device for latching a first body on a second body movable relative thereto along an adjacent path comprising the combination of claim 6 wherein the means operatively associated with the second body for locking the cylinder against rotation comprises a barrel disposed within the opening of the body and secured on the body, said barrel defining an internal cylindrical surface, an arm disposed within the barrel, means for mounting the arm on the barrel including a hinge joint adjacent to the barrel, said arm having a lobe extending outwardly therefrom remote from the barrel, and said arm being permanently magnetized with a magnetic pole associated with said lobe, said cylinder having a slot extending along the axis thereof accommodating the portion of the arm remote from the barrel, and said cylinder having an aperture therein adapted to engage the lobe in one rotational position of the cylinder relative to the barrel, said cylinder having a channel extending therein adjacent to the slot, said channel being adapted to receive a key having a permanently magnetized region adapted to confront the lobe of the arm, the magnetic field of the key reacting with the magnetic field of the lobe to pivot the arm and release the lobe from the aperture to permit the cylinder to rotate in the barrel.

10. A lock comprising a barrel adapted to be secured on a first body which is to be latched to a second body, said barrel having a cylindrical interior surface, an elongated rib disposed on the interior surface of the barrel parallel to the central axis of the barrel and extending inwardly from the interior surface of the barrel, said barrel having an elongated arcuate arm disposed in a plane normal to the central axis of the interior surface and a hinge joint extending between one end of the arm and a portion of the rib remote from the cylindrical interior surface of the barrel, said arm having a lobe extending outwardly from a portion of the arm remote from the hinge joint on an axis generally radial to the central axis of the interior surface, and said arm being magnetically polarized with one pole associated with said lobe, a rotor rotatably disposed within the barrel having an aperture adapted to accommodate the lobe of the barrel in one rotational position of the rotor relative to the barrel, the arm having a rest position in said rotatable position with the lobe disposed in the aperture, and magnetic means associated with the rotor for reacting with the magnetic field of the arm and urging the lobe from the aperture.

11. A closure comprising a first and a second member of material capable of maintaining magnetic polarization, the first of said members having a surface provided with a groove extending therein and the second of said members being provided with a ridge extending outwardly from a surface thereof adapted to mate with the grooves and be removably accommodated therein, said ridge having a first magnetic pole of one polarity disposed therein remote from the surface of the second member and a second magnetic pole of opposite polarity to the first pole disposed adjacent to the surface of the second member, and said first member having a first magnetic pole disposed adjacent to the groove and adjacent to the surface of the first member of the same polarity as the first pole of the second member and a second pole of opposite polarity to the first pole of said first member disposed adjacent to the groove and remote from the surface of the first member, one of said members being a cylindrical cap and the other of said members being a circular neck of a bottle, the groove and ridge being circular in configuration.

12. An article of manufacture comprising a container having a cylindrical neck constructed of material capable of maintaining magnetic polarization extending outwardly therefrom, said neck being magnetically polarized along vectors parallel to the central axis thereof, constructed of material capable of maintaining magnetic polarization and a cap having a flat surface and a hollow cylindrical portion extending normally therefrom, the inner diameter of the cylindrical portion of the cap slightly exceeding the outer diameter of the neck to form a snug slidable fit, the cylindrical portion of the cap being magnetically polarized along vectors generally parallel to the axis thereof directed oppositely to the magnetic polarization vectors of the neck when the cap is disposed about the neck.

13. An article of manufacture comprising the combination of claim 12 wherein the cap is provided with a peg extending along the axis of the cylindrical portion thereof having a diameter slightly less than the inner diameter of the neck of the container to provide a snug slidable fit in the neck, said peg being magnetically polarized along vectors directed parallel to and in the same direction as the magnetic polarization vectors of the cylindrical portion of the cap.

14. A closure comprising the combination of claim 11 wherein one of said members has a slot disposed parallel to the cylindrical axis thereof and a groove disposed in a plane perpendicular to the cylindrical axis thereof, and the other member has a ridge having an arc length less than the arc length of the slot and rotatably disposed within the groove.

References Cited

UNITED STATES PATENTS

| | | | |
|---|---|---|---|
| 2,121,301 | 6/1938 | Ractliffe ____________ | 70—276 |
| 2,648,884 | 8/1953 | Loofboro. | |
| 3,288,511 | 11/1966 | Tavano ___________ | 292—251.5 |

BERNARD A. GELAK, *Primary Examiner.*